United States Patent
Lum et al.

(10) Patent No.: US 9,437,040 B2
(45) Date of Patent: Sep. 6, 2016

(54) SYSTEM, METHOD, AND COMPUTER PROGRAM PRODUCT FOR IMPLEMENTING ANTI-ALIASING OPERATIONS USING A PROGRAMMABLE SAMPLE PATTERN TABLE

(71) Applicant: NVIDIA Corporation, Santa Clara, CA (US)

(72) Inventors: Eric B. Lum, San Jose, CA (US); Jeffrey Alan Bolz, Austin, TX (US); Timothy Paul Lottes, Cary, NC (US); Rui Manuel Bastos, Porto Alegre (BR); Barry Nolan Rodgers, Madison, AL (US); Gerald F. Luiz, Los Gatos, CA (US)

(73) Assignee: NVIDIA Corporation, Santa Clara, CA (US)

(*) Notice: Subject to any disclaimer, the term of this patent is extended or adjusted under 35 U.S.C. 154(b) by 19 days.

(21) Appl. No.: 14/082,038

(22) Filed: Nov. 15, 2013

(65) Prior Publication Data
US 2015/0138228 A1   May 21, 2015

(51) Int. Cl.
| | |
|---|---|
| G06T 15/00 | (2011.01) |
| G06T 19/00 | (2011.01) |
| G06T 3/40 | (2006.01) |
| G06T 5/00 | (2006.01) |
| G06T 1/20 | (2006.01) |
| G09G 5/36 | (2006.01) |
| G09G 5/39 | (2006.01) |
| G06F 17/30 | (2006.01) |
| G06T 15/50 | (2011.01) |

(52) U.S. Cl.
CPC ......... *G06T 15/503* (2013.01); *G06T 2200/12* (2013.01)

(58) Field of Classification Search
CPC ... G06T 11/001; G06T 15/005; G06T 19/00; G06T 15/405; G06T 15/04; G06T 3/4007; G06T 11/203; G06T 15/80; G06T 5/001; G06T 15/503; G06T 11/40; G06T 1/20; G06T 5/20; G06T 2200/12; G09G 5/363; G09G 5/39; G09G 5/42; G06F 17/30265; G06F 3/0601; G06F 9/34; G06F 12/1027; G06F 3/067; G06F 9/35
See application file for complete search history.

(56) References Cited

U.S. PATENT DOCUMENTS

| | | | |
|---|---|---|---|
| 6,466,206 B1 | 10/2002 | Deering | |
| 6,597,363 B1 * | 7/2003 | Duluk et al. | 345/506 |
| 7,050,068 B1 * | 5/2006 | Bastos et al. | 345/613 |

(Continued)

OTHER PUBLICATIONS

U.S. Appl. No. 14/024,555, filed Sep. 11, 2013.

(Continued)

*Primary Examiner* — Wesner Sajous
(74) *Attorney, Agent, or Firm* — Zilka-Kotab, PC

(57) ABSTRACT

A system, method, and computer program product are provided for implementing anti-aliasing operations using a programmable sample pattern table. The method includes the steps of receiving an instruction that causes one or more values to be stored in one or more corresponding entries of the programmable sample pattern table and performing an anti-aliasing operation based on at least one value stored in the programmable sample pattern table. At least one value is selected from the programmable sample pattern table based on, at least in part, a location of one or more corresponding pixels.

19 Claims, 11 Drawing Sheets

(56) References Cited

U.S. PATENT DOCUMENTS

| | | | |
|---|---|---|---|
| 7,126,615 B2* | 10/2006 | Liao | G09G 5/022 345/611 |
| 9,230,362 B2 | 1/2016 | Lum et al. | |
| 9,230,363 B2 | 1/2016 | Lum et al. | |
| 2003/0179199 A1* | 9/2003 | Deering | G06T 11/40 345/427 |
| 2012/0013624 A1* | 1/2012 | Fowler | G06T 11/40 345/520 |
| 2014/0333662 A1* | 11/2014 | Akenine-Moller | G09G 3/2003 345/604 |
| 2015/0070380 A1 | 3/2015 | Lum et al. | |
| 2015/0070381 A1* | 3/2015 | Lum et al. | 345/612 |

OTHER PUBLICATIONS

U.S. Appl. No. 14/024,558, filed Sep. 11, 2013.
U.S. Appl. No. 13/946,977, filed Jul. 19, 2013.
Notice of Allowance from U.S. Appl. No. 14/024,555, dated Sep. 1, 2015.
Notice of Allowance from U.S. Appl. No. 14/024,558, dated Aug. 25, 2015.
Burger, K. et al., "Sample-Based Surface Coloring," IEEE Transactions on Visualization and Computer Graphics, vol. 15, No. 5, Sep./Oct. 2010, pp. 763-776.
Office Action from U.S. Appl. No. 14/024,555, dated May 12, 2015.
Office Action from U.S. Appl. No. 14/024,558, dated May 12, 2015.

* cited by examiner (1xAA)

(2xAA)

(4xAA)

(8xAA)

(8xAA)

SYSTEM, METHOD, AND COMPUTER PROGRAM PRODUCT FOR IMPLEMENTING ANTI-ALIASING OPERATIONS USING A PROGRAMMABLE SAMPLE PATTERN TABLE

FIELD OF THE INVENTION

The present invention relates to graphics processing, and more particularly to anti-aliasing techniques.

BACKGROUND

Anti-aliasing techniques are well-known in the art of computer-generated graphics. Aliasing refers to image artifacts caused by a limited sampling resolution of smooth curves. One common artifact produced as a result of aliasing is a Moire pattern, which is a type of spatial aliasing that causes alternating bands of light and dark colors to appear when, e.g., two grids are overlaid at an angle.

There are many common techniques to reduce the artifacts caused by aliasing. For example, supersample anti-aliasing (SSAA) is a technique that selects multiple points within each pixel (not just the pixel center), shades each of the multiple points to generate multiple color values for the pixel, and then blends the multiple color values to generate a filtered color value for the pixel. It will be appreciated that SSAA increases the resolution of the generated digital image and then down-samples the digital image (i.e., filters) to get a digital image at the desired resolution. The artifacts due to aliasing in the down-sampled digital image are reduced when compared to an image generated at the final resolution. However, SSAA has drawbacks in that each point sampled within a pixel increases the computation required to generate the digital image (e.g., 4×SSAA requires approximately 4 times the number of texture operations compared to techniques which compute a single color for the pixel at the center of the pixel).

Another anti-aliasing technique is multi-sample anti-aliasing (MSAA), which is a special case of SSAA. In MSAA, the graphics processing pipeline implements certain operations using multiple sample points within each pixel; however, the fragment shading program is only computed once per pixel and is typically evaluated based on a sample location at the center of the pixel. MSAA typically involves a smaller number of computations when compared to SSAA because, e.g., texture reads are only performed for a single point for each pixel.

Modern graphics processors typically implement at least one technique to reduce aliasing artifacts. However, implementation of anti-aliasing techniques may reduce the processing efficiency of the graphics processing pipeline. Furthermore, many implementations of SSAA or MSAA in graphics processors utilize a fixed set of sample positions stored in static random access memory (SRAM), which limits the different anti-aliasing algorithms that can be implemented by software. Some algorithms for implementing anti-aliasing may benefit from varying sample patterns across the pixels of a digital image, which is not possible with fixed sample positions specified by the hardware architecture. Thus, there is a need for addressing this issue and/or other issues associated with the prior art.

SUMMARY

A system, method, and computer program product are provided for implementing anti-aliasing operations using a programmable sample pattern table. The method includes the steps of receiving an instruction that causes one or more values to be stored in one or more corresponding entries of the programmable sample pattern table and performing an anti-aliasing operation based on at least one value stored in the programmable sample pattern table. At least one value is selected from the programmable sample pattern table based on, at least in part, a location of one or more corresponding pixels.

DETAILED DESCRIPTION

Existing graphics hardware typically implements fixed sample patterns stored in SRAM that are utilized by various anti-aliasing algorithms implemented on the graphics hardware. However, for some classes of anti-aliasing algorithms, varying the sample pattern across pixels may be desired to produce better results. For example, support for jittered sample patterns may produce less regular "roping" aliasing artifacts, littering generates a more random noise within the digital image that is less disturbing to a viewer. Consequently, graphics hardware could benefit from allowing a programmer to specify the sample patterns for the different pixels in a digital image using various commands implemented by an Application Programming Interface (API).

In one embodiment, a processor implements one or more programmable sample pattern tables that specify relative sample locations within pixels for implementing anti-aliasing techniques. Multiple sub-units within the processor may include a separate and distinct programmable sample pattern table. The programmable sample pattern table may be configured via an instruction that is executed prior to processing one or more pixels by the sub-unit. Examples of various sub-units of the processor that may include a programmable sample pattern table are described in more detail below.

Figure 1:
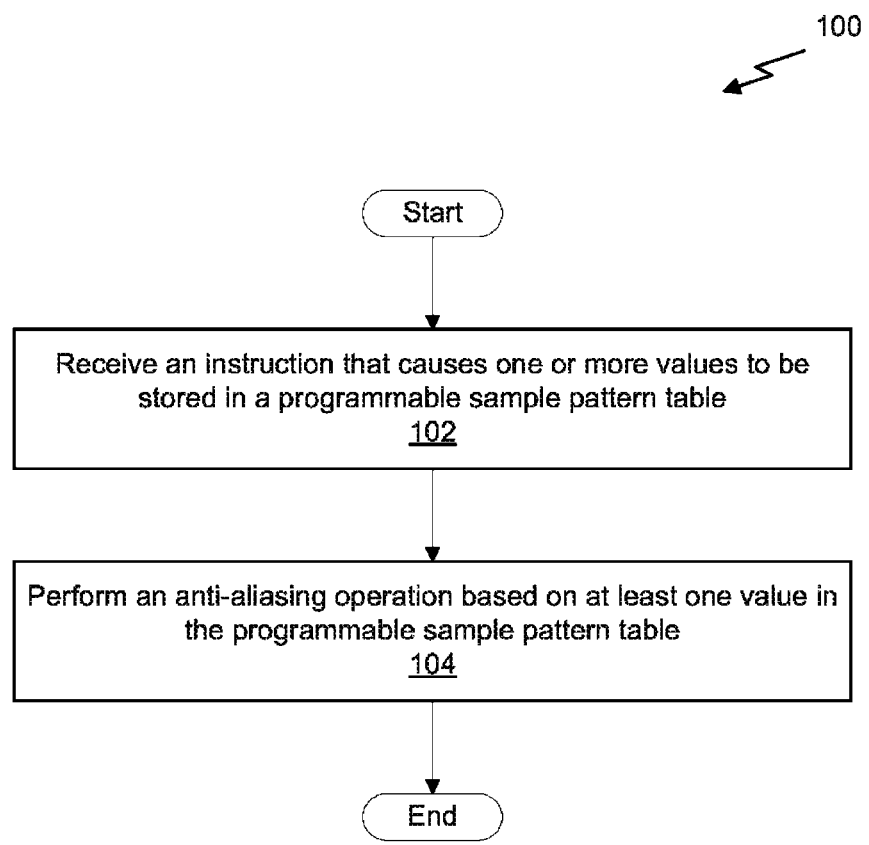
FIG. 1 illustrates a flowchart of a method for implementing an anti-aliasing technique utilizing a programmable sample pattern table, in accordance with one embodiment.

FIG. 1 illustrates a flowchart of a method 100 for implementing an anti-aliasing technique utilizing a programmable sample pattern table, in accordance with one embodiment. At step 102, an instruction is received that causes one or more values to be stored in a programmable sample pattern table. In the context of the present description, the programmable sample pattern table is a memory that stores one or more values that represent relative sample locations within a pixel. In one embodiment, the programmable sample pattern table is included in a hardware unit that, in response to receiving the instruction, copies one or more values from a local memory (e.g., a synchronous dynamic random access memory or SDRAM) into the programmable sample pattern table.

At step 104, an anti-aliasing operation is performed. The anti-aliasing operation is based on at least one value stored in the programmable sample pattern table. In the context of the present description, an anti-aliasing operation comprises any type of operation corresponding to a sample location for a pixel that includes two or more sample locations. In other words, an anti-aliasing operation is any operation that depends on the location of the sample in the pixel. Examples of typical anti-aliasing operations include, but are not limited to, computing a z-value for a geometric primitive at a corresponding sample location or generating a color value by sampling a texture map based on at least one texture coordinate interpolated at a corresponding sample location.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
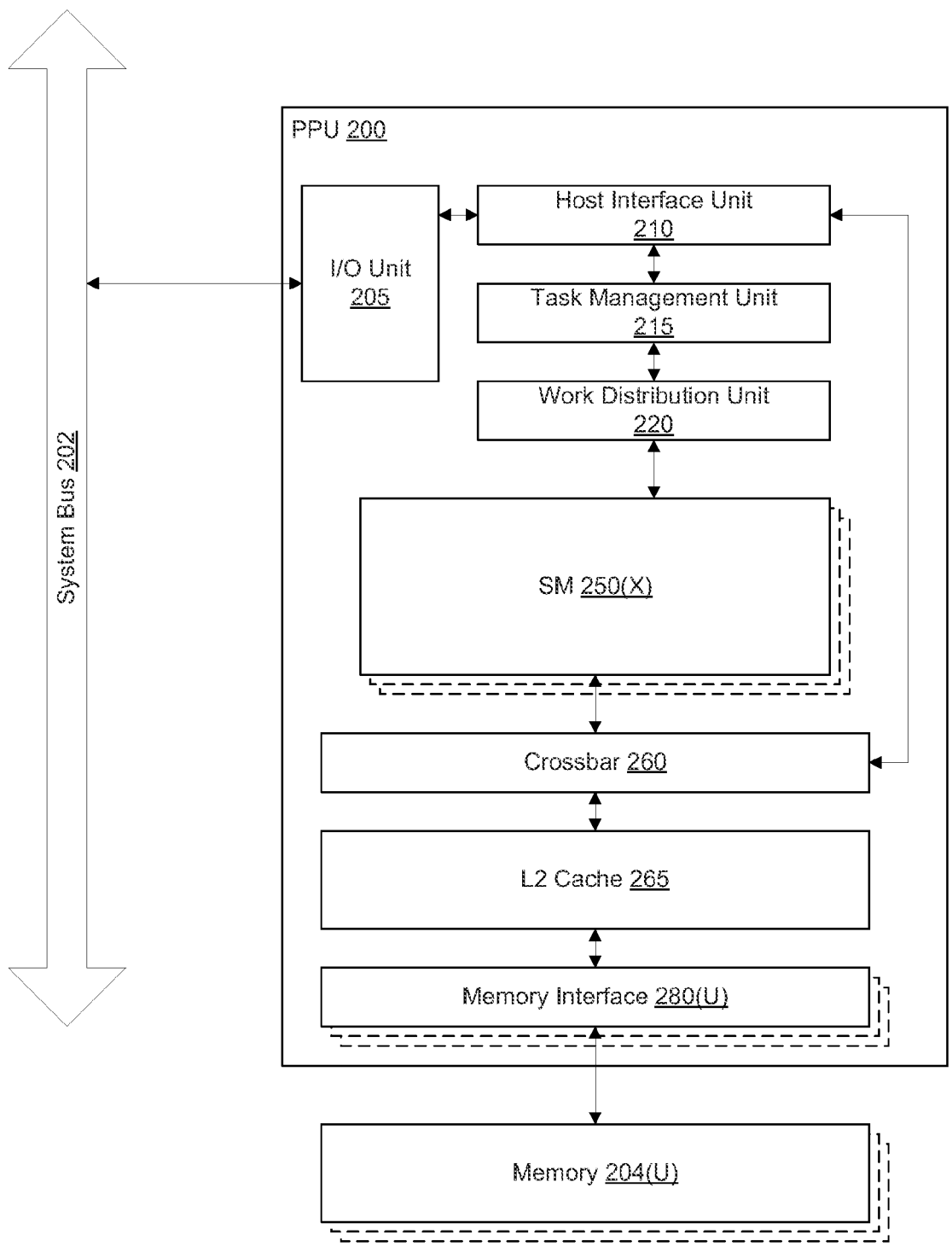
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify.

The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data net by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a simple semiconductor substrate. In another embodiment, the PPU 200 is included in a system-on-a-chip (SVC) along with one or more other logic units such as a reduced instruction set computer (RISC) CPU, a memory management unit (MMU), a digital-to-analog converter (DAC), and the like.

In one embodiment, the 200 may be included on a graphics card that includes one or more memory devices 204 such as GDDR5 SDRAM. The graphics card may be configured to interface with a Pete slot on a motherboard of a desktop computer that includes, e.g., a northbridge chipset and a southbridge chipset. In yet another embodiment, the PPD 200 may be an integrated graphics processing unit (iGPU) included in the chipset (i.e., Northbridge) of the motherboard.

Figure 3:
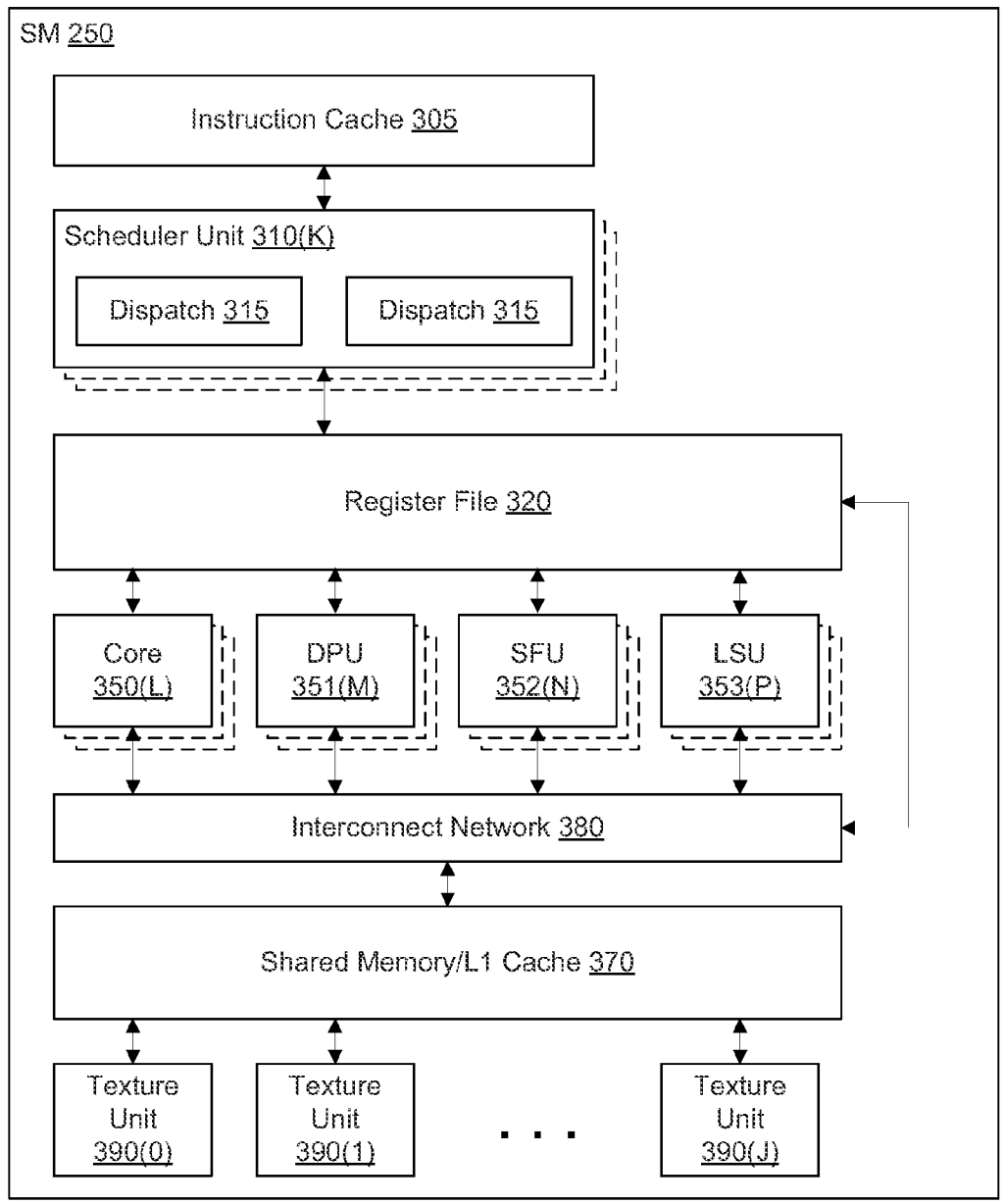
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Figure 4:
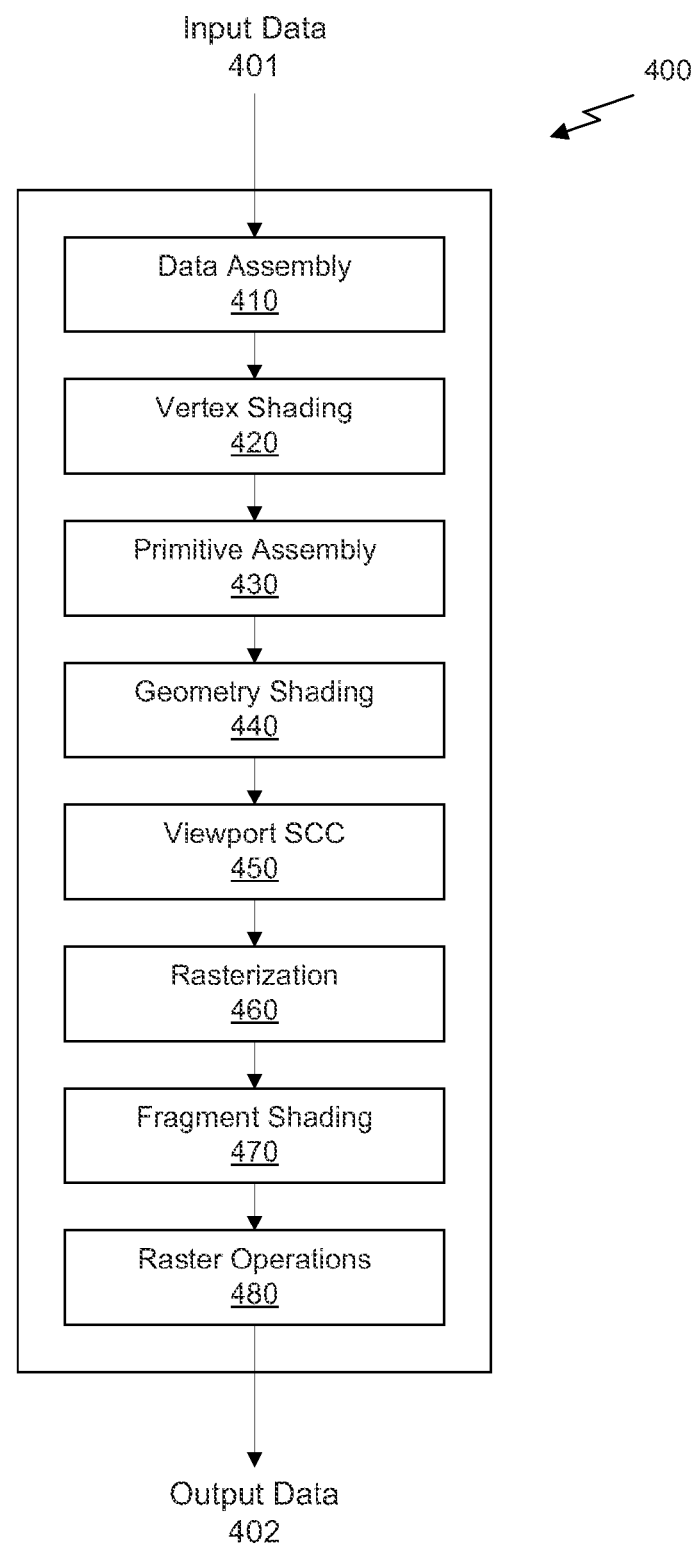
FIG. 4 is a conceptual diagram of a graphics processing pipeline implemented by the PPU of FIG. 2, in accordance with one embodiment.

FIG. 4 is a conceptual diagram of a graphics processing pipeline 400 implemented by the PPU 200 of FIG. 2, in accordance with one embodiment. The graphics processing pipeline 400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 400 receives input data 401 that is transmitted from one stage to the next stage of the graphics processing pipeline 400 to generate output data 402. In one embodiment, the graphics processing pipeline 400 may represent a graphics processing pipeline defined by the OpenGL® API.

As shown in FIG. 4, the graphics processing pipeline 400 comprises a pipeline architecture that includes a number of stages. The stages include, but are not limited to, a data assembly stage 410, a vertex shading stage 420, a primitive assembly stage 430, a geometry shading stage 440, a viewport scale, cull, and clip (VSCC) stage 450, a rasterization stage 460, a fragment shading stage 470, and a raster operations stage 480. In one embodiment, the input data 401 comprises commands that configure the processing units to implement the stages of the graphics processing pipeline 400 and geometric primitives (e.g., points, lines, triangles, quads, triangle strips or fans, etc.) to be processed by the stages. The output data 402 may comprise pixel data (i.e., color data) that is copied into a frame buffer or other type of surface data structure in a memory.

The data assembly stage 410 receives the input data 401 that specifies vertex data for high-order surfaces, primitives, or the like. The data assembly stage 410 collects the vertex data in a temporary storage or queue, such as by receiving a command from the host processor that includes a pointer to a buffer in memory and reading the vertex data from the buffer. The vertex data is then transmitted to the vertex shading stage 420 for processing.

The vertex shading stage 420 processes vertex data by performing a set of operations (i.e., a vertex shader or a program) once for each of the vertices. Vertices may be, e.g., specified as a 4-coordinate vector associated with one or more vertex attributes. The vertex shading stage 420 may manipulate properties such as position, color, texture coordinates, and the like. In other words, the vertex shading stage 420 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 420 generates transformed vertex data that is transmitted to the primitive assembly stage 430.

The primitive assembly stage 430 collects vertices output by the vertex shading stage 420 and groups the vertices into geometric primitives for processing by the geometry shading stage 440. For example, the primitive assembly stage 430 may be configured to group every three consecutive vertices as a geometric primitive (i.e., a triangle) for transmission to the geometry shading stage 440. In some embodiments, specific vertices may be reused for consecutive geometric primitives (e.g., two consecutive triangles in a triangle strip may share two vertices). The primitive assembly stage 430 transmits geometric primitives (i.e., a collection of associated vertices) to the geometry shading stage 440.

The geometry shading stage 440 processes geometric primitives by performing a set of operations (i.e., a geometry shader or program) on the geometric primitives. Tessellation operations may generate one or more geometric primitives from each geometric primitive. In other words, the geometry shading stage 440 may subdivide each geometric primitive into a finer mesh of two or more geometric primitives for processing by the rest of the graphics processing pipeline 400. The geometry shading stage 440 transmits geometric primitives to the viewport SCC stage 450.

The viewport SCC stage 450 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plan, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on depth of the viewing frustum. All potentially visible geometric primitives are then transmitted to the rasterization stage 460.

The rasterization stage 460 converts the 3D geometric primitives into 2D fragments, The rasterization stage 460 may be configured to utilize the vertices of the geometric primitives to setup a set of plane equations from which various attributes can be interpolated. The rasterization stage 460 may also compute a coverage mask for a plurality of pixels that indicates whether one or more sample location for the pixel intercept the geometric primitive. In one embodiment, z-testing may also be performed to determine if the geometric primitive is occluded by other geometric primitives that have already been rasterized. The rasterization stage 460 generates fragment data (i.e., interpolated vertex attributes associated with a particular sample location for each covered pixel) that are transmitted to the fragment shading stage 470.

The fragment shading stage 470 processes fragment data by performing a set of operations (i.e., a fragment shader or a program) on each of the fragments. The fragment shading stage 470 may generate pixel data (i.e., color values) for the fragment such as by performing lighting operations or sampling texture maps using interpolated texture coordinates for the fragment. The fragment shading stage 470 generates pixel data that is transmitted to the raster operations stage 480.

The raster operations stage 480 may perform various operations on the pixel data such as performing alpha tests, stencil tests, and blending the pixel data with other pixel data corresponding to other fragments associated with the pixel. When the raster operations stage 480 has finished processing the pixel data (i.e., the output data 402), the pixel data may be written to a render target such as a frame buffer, a color buffer, or the like.

It will be appreciated that one or more additional stages may be included in the graphics processing pipeline 400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 440). Other types of graphics processing pipelines are contemplated as being within the scope of the present disclosure. Furthermore, any of the stages of the graphics processing pipeline 400 may be implemented by one or more dedicated hardware units within a graphics processor such as PPU 200. Other stages of the graphics processing pipeline 400 may be implemented by programmable hardware units such as the SM 250 of the PPU 200.

Figure 5:
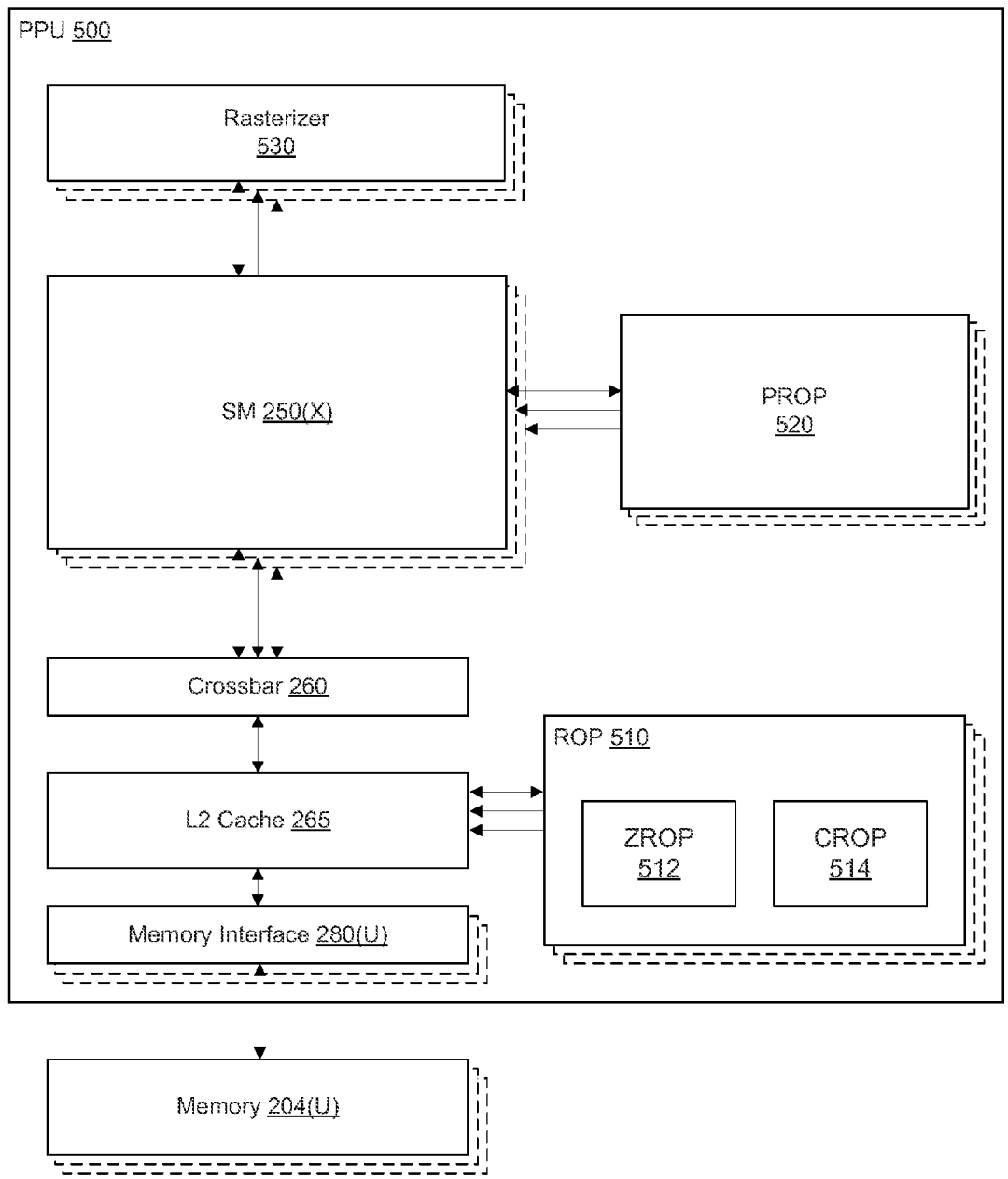
FIG. 5 illustrates a PPU that is configured to implement the graphics processing pipeline, in accordance with another embodiment.

FIG. 5 illustrates a PPU 500 that is configured to implement the graphics processing pipeline 400, in accordance with another embodiment. The PPU 500 is similar to PPU 200 of FIG. 2. The PPU 500 may include one or more dedicated hardware units for implementing various stages of the graphics processing pipeline 400 while other stages of the graphics processing pipeline 400 may be implemented within the programmable SMs 250. As shown in FIG. 5, the PPU 500 includes one or more raster operations units 510, one or more pre-raster operations (PROP) units 520, and one or more rasterizers 530. Each of these dedicated hardware units may be configured to implement at least a portion of the operations for a stage of the graphics processing pipeline 400, described above.

In one embodiment, the raster operations (ROP) units 510 include a z-raster operations (ZROP) engine 512 and a color-raster operations (CROP) engine 514. The ZROP engine 512 compares Z-values for pixel data to previously stored Z-values for the corresponding sample locations. The results from the ZROP engine 512 determine if the various pixel data for a fragment will be kept or discarded. More specifically, the ZROP engine 512 compares the Z-value of each sample location with the Z-value of a corresponding sample location stored in a depth map (i.e., Z-buffer). This process is known as Z-testing. If the current fragment passes Z-testing, then the ZROP engine 512 optionally writes the Z-value for the current fragment to the corresponding sample location in the depth map. If the current fragment does not pass Z-testing, then the pixel data may be discarded and the Z-value for the current fragment is not written to the depth map. The CROP engine 514 writes the color value for the current fragment to the frame buffer if the fragment passes the Z-testing.

In one embodiment, the number of ROP units 510 may be equal to the number of memory partitions 204, with each ROP unit 510 allocated to a particular memory partition 204. The ZROP unit 512 or the CROP unit 514 reads or writes values to the L2 cache 265. Then, the L2 cache 265 manages memory fetch requests from the memory 204 or the write-back of dirty data from the L2 cache 265 into the memory 204. Although not explicitly shown, the ROP units 510 may be coupled to the L2 Cache 265 as well as the SM 250 and the PROP units 520 via the crossbar 260.

The PROP units 520 manage the flow of pixel data between the ZROP engine 512, the CROP engine 514, and the SM 250. In one embodiment, the number of PROP units 520 matches the number of SMs 250, with each PROP unit 520 allocated to a particular SM 250. It will be appreciated that the number of PROP units 520 is not necessarily the same as the number of ROP units 510. Again, although not explicitly shown, the PROP units 520 may communicate with the ROP units 510 via the crossbar 260.

In addition to the ROP units 510 and the PROP units 520, the PPU 500 includes one or more rasterizers 530 coupled to the one or more SMs 250. In one embodiment, the number of rasterizers 530 equals the number of SMs 250. Each rasterizer 530 is a dedicated hardware unit configured to perform at least a portion of the operations of the rasterization stage 460 of the graphics processing pipeline 400, described above. For example, the rasterizer 530 may receive a geometric primitive from the VSCC stage 450 and set up plane equations corresponding to the geometric primitive. Although not explicitly shown, the rasterizers 530 may be coupled to the crossbar 260 in order to communicate with other units of the PPU 500 such as the SMs 250 or a hardware unit configured to implement at least a portion of the operations of the VSCC stage 450 of the graphics processing pipeline 400.

It will be appreciated that the rasterizers 530 implement anti-aliasing operations. For example, in order to calculate a coverage mask for a tile of pixels, the rasterizer 530 performs intersection tests that determine whether rays that intersect each sample location in the tile of pixels intersect a geometric primitive. The intersection tests indicate whether the sample locations associated with the rays are covered by the geometric primitive. The coverage information is passed down the graphics processing pipeline to the fragment shading stage 470. If anti-aliasing techniques are implemented, then the intersection tests should be computed for each of the two or more sample locations within a pixel. Therefore, the rasterizer 530 includes a programmable sample pattern table for determining a location for each of the sample locations within a particular pixel.

In one embodiment, the rasterizers 530 may be configured to cull small triangles. Culling by the VSCC stage 450 may be performed based on the extents of the surface (i.e., window). However, there may also be some primitives that, while included within the extents of the surface, do not intersect any of the programmable sample locations within a surface. For example, very small or thin triangles might intersect one or more pixels without actually intersecting any of the programmable sample locations within those pixels. In such cases, the rasterizers 530 may be configured to cull these primitives based on the locations included in the programmable sample pattern tables. In another embodiment, the VSCC stage 450 may be configured to cull such small primitives. Additional units within the PPU 500 may also implement anti-aliasing operations including the ZROP engine 512 and any SM 250 configured to execute a fragment shader.

Figure 6A:
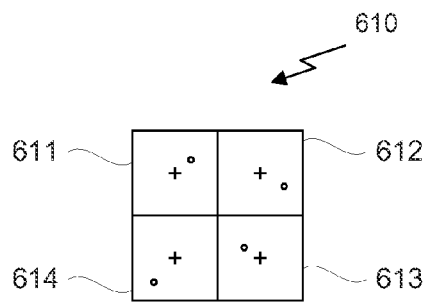
FIGS. 6A through 6E illustrate various anti-aliasing sample patterns, in accordance with one embodiment.

FIGS. 6A through 6E illustrate various anti-aliasing sample patterns, in accordance with one embodiment. As shown in FIG. 6A, a 1× anti-aliasing (1×AA) sample pattern may be defined for a pixel quad 610. The pixel quad 610 is a 2×2 array of pixels (611, 612, 613, and 614). In one embodiment, the sample pattern for the pixel quad 610 comprises each of the pixel centers (shown as cross-hairs in FIG. 6A). In other words, when the PPU 500 is configured to generate pixel data using 1×AA, a single sample position for each pixel corresponds to the pixel center. However, because the sample pattern is a regularly spaced array with one sample point per pixel, the pixel data may include aliasing artifacts. In another embodiment, the sample pattern for the pixel quad 610 may be jittered (i.e., randomly distributed throughout the pixels) in order to alleviate the aliasing artifacts. As shown in FIG. 6A, the jittered sample locations for each pixel may be shown by the small circles offset from each pixel's center. By moving the sampling locations so that the sampling locations are not located at the pixel centers, the resulting pixel data includes some amount of random noise, which alleviates the aliasing artifacts by some small amount.

Figure 6B:
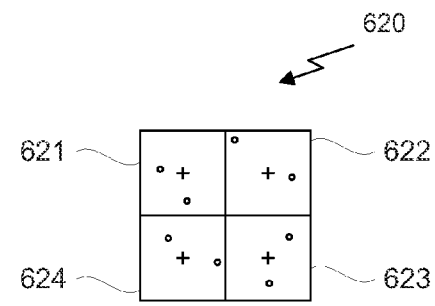
Figure 6C:
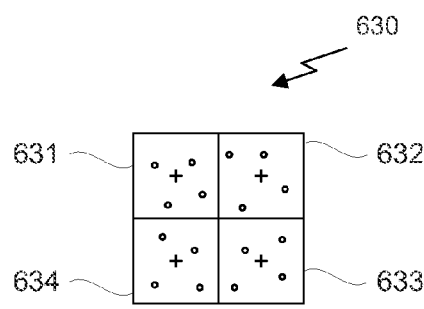

While jittering the sample locations alleviates the aliasing artifacts, rendering the image at a higher resolution and then down-sampling the high-resolution image to generate the resulting image data helps reduce aliasing artifacts even more. As shown in FIG. 6B, each pixel (621, 622, 623, and 624) in the pixel quad 620 includes two sample locations. Two sample locations per pixel corresponds to 2× anti-abasing (2×AA). Again, the sample locations in the sample pattern for the pixel quad 620 may be randomly distributed within the pixels. As shown in FIG. 6C, a pixel quad 630 may include pixels (631, 632, 633, and 634) that include four sample locations corresponding to 4× anti-aliasing (4×AA). A sample pattern defining sample locations that are distributed within less than four pixels or more than four pixels is contemplated as being within the scope of the present disclosure.

Figure 6D:
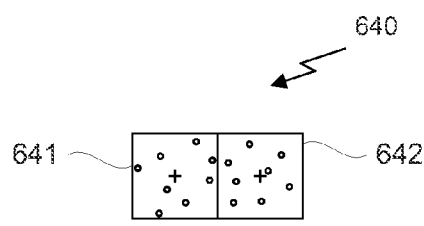
Figure 6E:
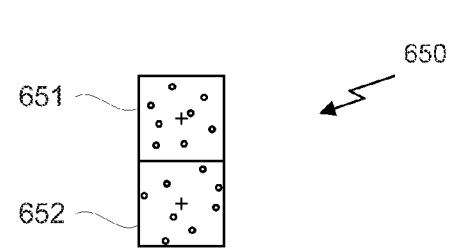

Some graphics hardware may be limited in the number of fixed sample locations that are stored in hardware units. For example, some hardware units may have a limit of 16 sample locations per pixel quad. While this limitation enables 4×AA for a pixel quad, 8× anti-aliasing (8×AA) cannot be performed for a pixel quad because this configuration may require 32 sample locations. In such cases, two pixels can be processed substantially simultaneously in either a 1×2 array of pixels (FIG. 6D) or a 2×1 array of pixels (FIG. 6E). As shown in FIG. 6D, each pixel (641 and 642) in the pixel pair 640 includes eight sample locations. Similarly, as shown in FIG. 6E, each pixel (651 and 652) in the pixel pair 650 includes eight sample locations. Furthermore, with such limitations, each pixel will have the same sample locations when implementing 16×AA.

Figure 7:
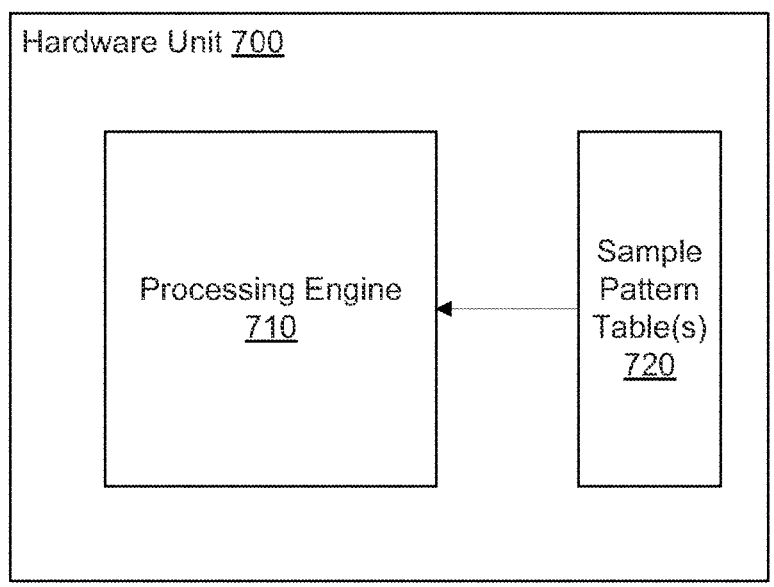
FIG. 7 illustrates a hardware unit configured to utilize a sample pattern for performing a calculation, in accordance with one embodiment.

FIG. 7 illustrates a hardware unit 700 configured to utilize a sample pattern for performing a calculation, in accordance with one embodiment. The hardware unit 700 may be, for example, the ROP units 510, the PROP units 520, the rasterizers 530, an SM 250, or any other unit that utilizes sample patterns for performing some type of calculation. As shown in FIG. 7, the hardware unit 700 includes a processing engine 710 and one or more sample pattern table(s) 720. The processing engine 710 may be logic or circuitry configured to perform an operation that depends, at least partially, on a sample location within a pixel. For example, the processing engine 710 may include logic for calculating Z-values for a sample location of a pixel that is covered by a geometric primitive. In another example, the processing engine 710 may include logic for generating a color value using texture coordinates associated with a sample location.

In one embodiment, the sample pattern table(s) 720 store the sample locations for a sample pattern associated with an anti-aliasing algorithm. For example, a sample pattern table for the 1×AA algorithm shown in FIG. 6A may include four entries corresponding to each of the sample locations for the pixel quad 610. Each entry in the sample pattern table may specify an offset from an origin of a corresponding pixel. For example, if the offset is the center of the pixel, each entry may include two signed integers that represent a horizontal and a vertical displacement of the sample location from the center of the pixel. In another example, if the offset is at a corner of the pixel, each entry may include two unsigned integers that represent a horizontal and a vertical displacement of the sample location from the corner of the pixel.

Figure 8A:
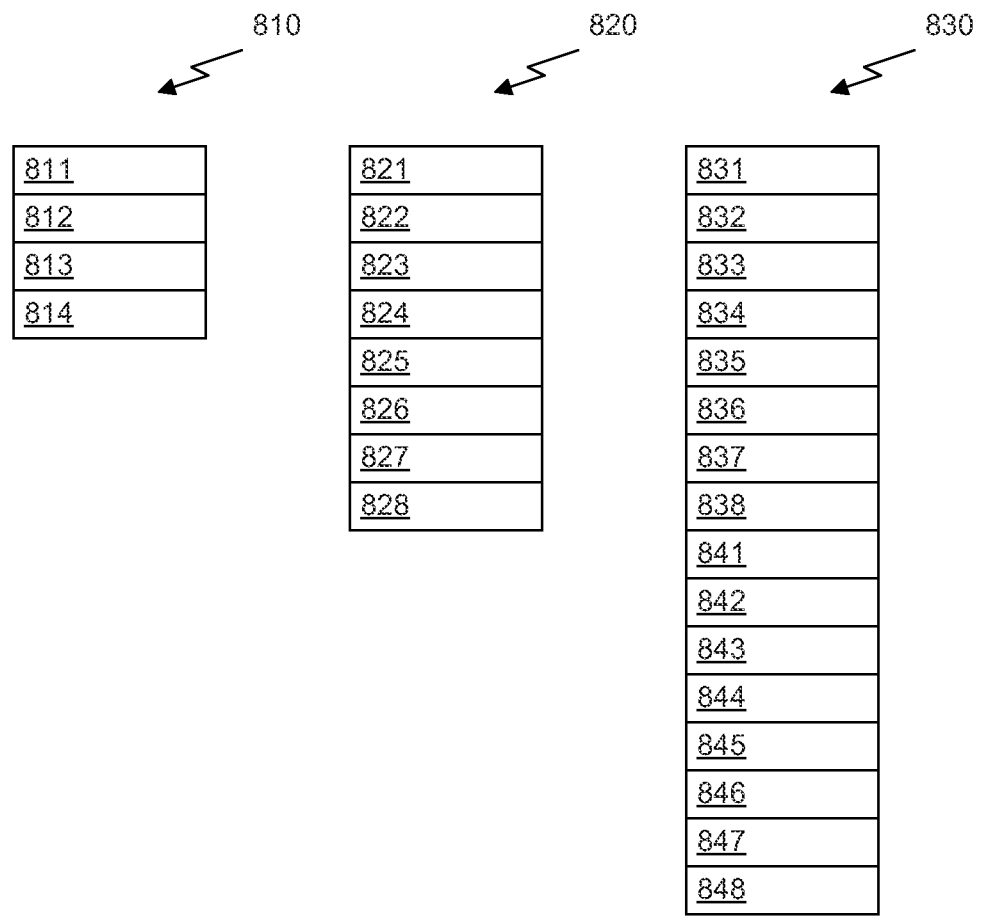
FIG. 8A illustrates a plurality of sample pattern tables for implementing anti-aliasing algorithms, in accordance with one embodiment.

FIG. 8A illustrates a plurality of sample pattern tables for implementing anti-aliasing algorithms, in accordance with one embodiment. In some systems that implement anti-aliasing, each hardware unit 700 includes a set of tables corresponding to the different anti-aliasing algorithms implemented by the graphics processor. As shown in FIG. 8A, the sample pattern tables 720 may include a first sample pattern table 810 that includes four entries corresponding to a 1×AA algorithm. A first entry 811 may specify an offset for a sample location for a first pixel 611 in a pixel quad 610, a second entry 812 may specify an offset for a sample location for a second pixel 612 in the pixel quad 610, a third entry 813 may specify an offset for a sample location for a third pixel 613 in the pixel quad 610, and a fourth entry 814 may specify an offset for a sample location for a fourth pixel 614 in the pixel quad 610. When the graphics processor is configured to perform 1×AA, the hardware unit 700 selects the first sample pattern table 810 for generating sample locations for pixels when performing specific operations that depend on the sample location.

If the graphics processor is configured to use a 2×AA algorithm, then the hardware unit 700 may be configured to select a second sample pattern table 820 that includes eight entries, which correspond to the eight sample locations for a pixel quad processed using the 2×AA algorithm. A first entry 821 may specify an offset for a first sample location for a first pixel 621 in a pixel quad 620, a second entry 822 may specify an offset for a second sample location for the first pixel 621 in the pixel quad 620, a third entry 823 may specify an offset for a first sample location for a second pixel 622 in the pixel quad 620, a fourth entry 824 may specify an offset for a sample location for the second pixel 622 in the pixel quad 620, and so forth (i.e., entries 825-828 correspond to the first and second sample locations for the third pixel 623 and fourth pixel 624 of the pixel quad 620, respectively).

Similarly, if the graphics processor is configured to use a 4×AA algorithm, then the hardware unit 700 may be configured to select a third sample pattern table 830 that includes sixteen entries, which correspond to the sixteen sample locations for a pixel quad processed using the 4×AA algorithm. The first four entries (i.e., entries 831-834) of the third sample pattern table 830 may specify an offset for four corresponding sample locations for a first pixel 631 in a pixel quad 630, the next four entries (i.e., entries 835-838) of the third sample pattern table 830 may specify an offset for four corresponding sample locations for a second pixel 632 in a pixel quad 630, and so forth.

It will be appreciated that, although not explicitly shown, multiple tables may be used to specify different sample patterns for the same anti-aliasing algorithm. For example, where the sample locations of sample pattern table 810 specify the centers of the pixels, another four entry sample pattern table may be included in the sample pattern tables 720 that specifies jittered sample locations rather than the pixel centers. Multiple sample pattern tables for the same anti-aliasing algorithm (e.g., 1×AA) enable different configurations to be selected when sampling pixels.

It will be appreciated that a different sample pattern table must be included in each hardware unit within the graphics processor in order to implement each distinct anti-aliasing algorithm that is enabled. In the case where the graphics processor includes many different hardware units configured to implement different stages of the graphics processing pipeline, many instances of these sample pattern tables will be implemented in the different hardware units. Implementing many instances of many different tables takes up valuable die overhead, increasing the size and complexity of the graphics processor integrated circuit.

Figure 8B:
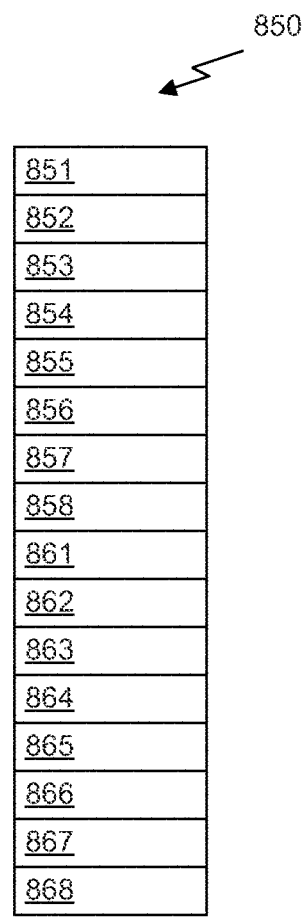
FIG. 8B illustrates a programmable sample pattern table, in accordance with another embodiment.

FIG. 8B illustrates a programmable sample pattern table 850, in accordance with another embodiment. In contrast with the multiple sample pattern tables 720 illustrated in FIG. 8A, utilizing a programmable sample pattern table 850 within the sample pattern table(s) 720 enables a single table to be allocated for multiple antialiasing algorithms, allowing the copying of new values into the programmable sample pattern table 850 in order to change the sample locations for corresponding pixels.

In one embodiment, each slot of the programmable sample pattern table 850 stores an 8-bit value that indicates an offset from the upper left corner of a pixel using two 4-bit values, where a first portion (i.e., the four most significant bits) of the 8-bit value indicates a horizontal offset from the upper left corner of the pixel and a second portion (i.e., the four least significant bits) of the 8-bit value indicates a vertical offset from the upper left corner of the pixel. In other words, each value stored in a slot of the programmable sample pattern tables indicates one of 256 possible sample locations within a pixel relative to the upper left corner of the corresponding pixel. In other embodiments, each slot of the programmable sample pattern table 850 may store a number of bits less than or more than 8-bits. For example, each slot of the programmable sample pattern table 850 may store 64 bits, holding two 32-bit single-precision floating point values that range between 0.0 and 1.0 that indicate a relative position within the pixel (where the upper left corner of the pixel corresponds to an entry of <0,0, 0,0> and the lower right corner of the pixel corresponds to an entry of <1.0, 1.0>).

As shown in FIG. 8B, the programmable sample pattern table 850 includes sixteen entries (851-858 and 861-868). It will be appreciated that sixteen entries is the maximum entries for any of the example anti-aliasing algorithms illustrated in FIGS. 6A-6E. In one embodiment, the PPU 550 has an architecture that executes sixteen threads in parallel simultaneously, thereby calculating values for each of the samples in a pixel quad (or a pixel pair in the case of 8×AA) in parallel. Thus, a sixteen entry programmable sample pattern table 850 is large enough to handle every sample executed in parallel and can be reprogrammed for subsequent pixel quads if necessary. However, there is no inherent reason to limit the number of entries of the programmable sample pattern table 850 to sixteen entries for other architectures, and a different number of entries, less than or greater than sixteen is contemplated as being within the scope of the present disclosure.

In operation, a host processor may generate instructions within a stream of instructions and data to be processed by the PPU 500 that, as the instructions are passed down the graphics processing pipeline 400 and received by the various hardware units 700 of the PPU 500, cause new values to be written into the programmable sample pattern table 850. The instruction may be ordered prior to data to be processed using sample locations that correspond to the new values. For example, a first instruction may configure the hardware unit 700 to process a first pixel quad according to a 4×AA algorithm using a first set of sample locations. Once the first pixel quad has been processed and prior to a second pixel quad being processed, a second instruction may re-configure the hardware unit 700 to process the second pixel quad according to the 4×AA algorithm using a second set of sample locations that is different than the first set of sample locations. Alternately, the second instruction could re-configure the hardware unit 700 to process the second pixel quad according to a different anti-aliasing algorithm entirely, such as a 2×AA algorithm.

It will be appreciated that the programmable sample pattern table 850 may include more entries than sample locations that are specified for a particular anti-aliasing algorithm. For example, a 1×AA algorithm requires only four sample locations per pixel quad. In one embodiment, the first four entries (i.e., entries 851-854) may be filled with valid sample location data and the other twelve entries of the programmable sample pattern table 850 may contain invalid data. Similarly, for a 2×AA algorithm that requires eight sample locations per pixel quad, the first eight entries (i.e., entries 851-858) may be filled with valid sample location data and the other eight entries of the programmable sample pattern table 850 may contain invalid data.

In another embodiment, a first instruction may configure the programmable sample pattern table 850 such that each entry of the table contains valid sample location data. However, when a 1×AA or a 2×AA algorithm is enabled, multiple sets of sample locations may be stored in the programmable sample pattern table 850 simultaneously and each pixel quad may specify which of the patterns in the programmable sample pattern table 850 should be used for that particular pixel quad. For example, in conjunction with a 1×AA algorithm, the first four entries (i.e., entries 851-854) may be filled with valid sample location for a first set of sample locations, the second four entries (i.e., entries 855-858) may be filled with valid sample location for a second set of sample locations, and so forth. Pixel quads may then be configured to use one of the four valid sets of sample locations stored in the programmable sample pattern table 850. In one embodiment, the x-coordinate and y-coordinate of at least one pixel in the pixel quad may be used, at least in part, to select which of the sets of sample locations should be associated with the pixel quad. For example, a function based on the x-coordinate and y-coordinate of the upper left pixel in the pixel quad could be used to calculate which of the four sets of sample locations are associated with that particular pixel quad (e.g., $f(x,y)+y) \% 4$).

In yet another embodiment, the programmable sample pattern table 850 may include sixteen unrelated entries representing sixteen different locations relative to the upper left corner of a pixel. For each sample in a particular pixel, a hash function may be used to generate an index that points to an entry of the programmable sample pattern table 850 that specifies the location of the sample relative to the upper left corner of the pixel. Each sample in a pixel may be required to hash to a different index such as by the function $f(x,y,i)=g(x,y) \% 4+i$, where i is an index for the sample for the pixel. Because $g(x,y) \% 4$ is constant for a particular pixel, each sample will generate a different index within the programmable sample pattern table.

In one embodiment, the values in the programmable sample pattern table 850 may be normalized to enable "window offset" support or "y-inversion" support. In other words, the values included in the programmable sample pattern table 850 may be "surface-relative", while the application expects the values to be "window-relative". In other words, the application expects a first sample location in the upper left pixel in the active window to be associated with the first sample location in the programmable sample pattern table 850. However, if the active window is offset relative to the display surface, the upper left pixel may not correspond to the expected values in the programmable sample pattern table 850.

In order to correct for this window offset, the values of the programmable sample pattern table 850 may be rearranged such that the "surface-relative" pixel coordinates for pixels in the active window correspond to the expected window-relative index into the programmable sample pattern table 850. For example, if the window is shifted one pixel to the right, and the surface is divided into pixel quads having indices of one for the upper left pixel in the pixel quad, two for the upper right pixel in the pixel quad, three for the lower right pixel in the pixel quad, and four for the lower left pixel in the pixel quad, then the values specified for the first pixel of the pixel quad may be inserted into the second index of the programmable sample pattern table 850, the values specified for the second pixel of the pixel quad may be inserted into the first index of the programmable sample pattern table 850, the values specified for the third pixel of the pixel quad may be inserted into the fourth index of the programmable sample pattern table 850, and the values specified for the fourth pixel of the pixel quad may be inserted into the third index of the programmable sample pattern table 850. This arrangement of the values in the programmable sample pattern table 850 may be made automatically by the hardware units to correct for the window offset. A similar effect can be performed for enabling "y-inversion" support (i.e., where y coordinates are specified from the bottom of the window rather than the top of the window). In alternative embodiments, the hash function can be adjusted to correct for window offset or y-inversion rather than changing the order of the values in the programmable sample pattern table 850.

It will be appreciated that the flexibility of the programmable sample pattern table 850 may be utilized to increase processing efficiency of graphics hardware. For example, a user may want to utilize a 4×AA algorithm with a particular application such as a video game. However, the graphics hardware may not have the processing capacity to implement the 4×AA algorithm at a sufficient frame rate. Instead, the graphics hardware can implement a 2×AA algorithm for a first frame using a first set of sample locations and then implement a 2×AA, for a second frame using a second set of sample locations, alternating between the first set of sample locations and the second set of sample locations every other frame. In doing so, the graphics hardware produces video data that is effectively 4×AA by dithering between two values every other frame. In sonic cases, every other pixel can be configured to use a different set of sample locations such that some artifacts are not as noticeable. For example, with long narrow geometric primitives that span multiple pixels, the first set of sample locations might not intersect the geometric primitive at all while the second set of sample locations does intersect the geometric primitive. By alternating which pixels in a particular frame use the first set of sample locations and the second set of sample locations, each frame includes pixels representing a portion of the geometric primitive rather than having one frame that includes pixels that represent the geometric primitive and a subsequent from that does not include pixels that represent the geometric primitive.

Figure 9:
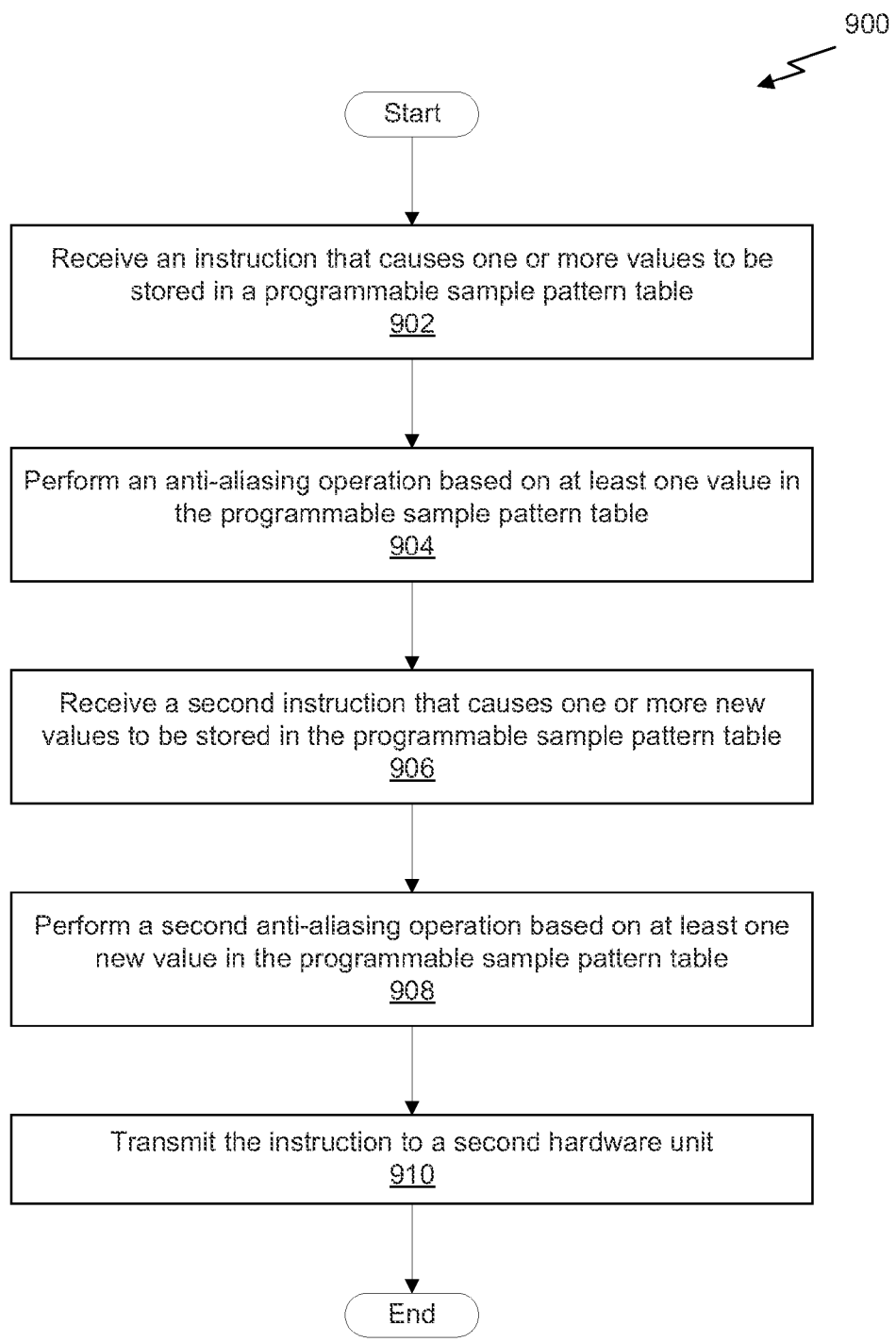
FIG. 9 illustrates a flowchart of a method for implementing an anti-aliasing technique utilizing a programmable sample pattern table, in accordance with another embodiment.

FIG. 9 illustrates a flowchart of a method 900 for implementing an anti-aliasing technique utilizing a programmable sample pattern table, in accordance with another embodiment. At step 902, a hardware unit 700 receives an instruction that causes one or more values to be stored in a programmable sample pattern table 850 included in the hardware unit 700. A driver in a host processor may generate the instructions and data processed by the hardware unit 700. The driver may include an instruction prior to data for one or more pixels that reconfigures the programmable sample pattern table 850 with new sample locations values for one or more antialiasing operations. In one embodiment, the instruction specifies the one or more values to be written to the programmable sample pattern table 850. In another embodiment, the instruction includes a pointer to a location in a memory that stores a copy of the one or more values to be written to the programmable sample pattern table 850. At step 904, the hardware unit 700 performs an anti-aliasing operation based on at least one value stored in the programmable sample pattern table. Again, the anti-aliasing operation is any type of operation that depends, at least partially, on a sample location within a pixel that includes multiple sample locations in response to processing pixels according to an anti-aliasing algorithm.

At step 906, the hardware unit 700 receives a second instruction that causes one or more new values to be stored in the programmable sample pattern table. Again, the one or more new values may be included in the second instruction or the second instruction may include a pointer to a location in a memory that stores a copy of the one or more new values. Importantly, the second instruction can be included anytime within the data stream being processed by the hardware unit 700. In other words, the sample locations stored in the programmable sample pattern table 80 can be changed after every frame, after every pixel tile, after every pixel quad, or even after every pixel, depending on the implementation. At step 908, the hardware unit 700 performs a second anti-aliasing operation based on at least one new value stored in the programmable sample pattern table.

At step 910, the hardware unit 700 transmits the instruction to a second hardware unit 700. In one embodiment, the hardware unit 700 may be, e.g., a rasterizer 530, which transmits the instruction to a ZROP engine 512 for performing a Z-test. The instruction causes the second hardware unit to store the one or more values in a second programmable sample pattern table.

Figure 10:
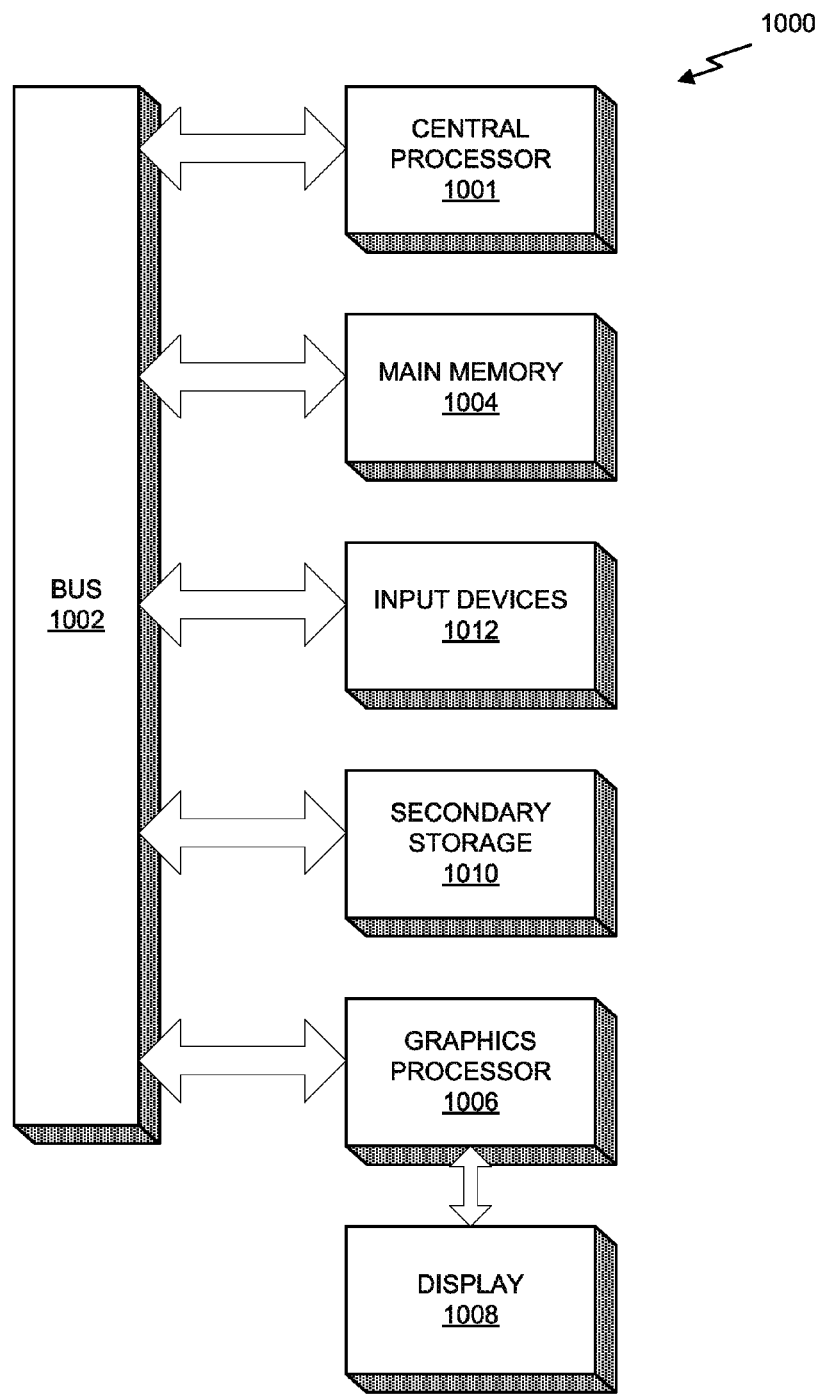
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component interconnect), PCI-Express, AGP (Accelerated Graphics Port), HyperTransport, or any other bus or point-to-point communication protocol(s), The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU). In one embodiment, at least one module in the graphics processor 1006 comprises a hardware unit 700 that includes the programmable sample pattern table 850.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (FWD) drive, recording device, universal serial bus (USB) flash memory. The removable storage drive reads from and/or writes to a removable storage unit in a well-known manner.

Computer programs, or computer control logic algorithms, may be stored in the main memory 1004 and/or the secondary storage 1010. Such computer programs, when executed, enable the system 1000 to perform various functions. The memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (IDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   receiving, by a parallel processing unit (PPU) that includes a hardware unit, an instruction that causes one or more values to be stored in one or more corresponding entries of a programmable sample pattern table; and
   performing, by the hardware unit, an anti-aliasing operation based on at least one value stored in the programmable sample pattern table,
   wherein the at least one value is selected from the programmable sample pattern table based on, at least in part, a location of one or more corresponding pixels.

2. The method of claim 1, wherein each value in the programmable sample pattern table represents a relative sample location within a pixel.

3. The method of claim 2, wherein each value comprises two 4-bit integers.

4. The method of claim 2, wherein a first portion of the value represents a horizontal offset from a corner of the pixel and a second portion of the value represents a vertical offset from the corner of the pixel.

5. The method of claim 1, wherein each value comprises two single-precision, floating-point numbers.

6. The method of claim 1, further comprising:
   receiving, by the PPU, a second instruction that causes the one or more values to be stored in a second programmable sample pattern table; and
   performing by the hardware unit, a second anti-aliasing operation based on at least one new value stored in the second programmable sample pattern table.

7. The method of claim 6, wherein the programmable sample pattern table is included in a first hardware unit of the PPU and the second programmable sample pattern table is included in a second hardware unit of the PPU.

8. The method of claim 7, wherein the first hardware unit implements at least a portion of a first stage of a graphics processing pipeline and the second hardware unit implements at least a portion of a second stage of the graphics processing pipeline.

9. The method of claim 7, further comprising transmitting the instruction to the second hardware unit, wherein the second instruction causes the second hardware unit to store the one or more values in the second programmable sample pattern table.

10. The method of claim 1, wherein the anti-aliasing operation comprises computing a z-value for a geometric primitive at a sample location specified by the at least one value.

11. The method of claim 1, wherein the anti-aliasing operation comprises generating a color value by sampling a texture map based on at least one texture coordinate interpolated at a sample location specified by the at least one value.

12. The method of claim 1, wherein the anti-aliasing operation comprises determining whether a sample location intersects at least one of a triangle, a line, and a point.

13. The method of claim 1, wherein the anti-aliasing operation comprises culling a graphics primitive when the graphics primitive does not intersect at least one sample location specified by the at least one value stored in the programmable sample pattern table.

14. The method of claim 1, wherein the one or more values are stored in one or more corresponding entries of the programmable sample pattern table based on an offset of a window relative to an origin of a surface.

15. The method of claim 1, wherein the instruction includes a pointer to a copy of the one or more values in a memory.

16. A non-transitory computer-readable storage medium storing instructions that, when executed by a parallel processing unit (PPU) that includes a hardware unit, causes the hardware unit to perform steps comprising:

storing one or more values in one or more corresponding entries of a programmable sample pattern table; and performing an anti-aliasing operation based on at least one value stored in the programmable sample pattern table, wherein the at least one value is selected from the programmable sample pattern table based on, at least in part, a location of one or more corresponding pixels.

17. A system comprising:

a parallel processing unit (PPU) that includes a hardware unit configured to:

store one or more values in one or more corresponding entries of a programmable sample pattern table, and perform an anti-aliasing operation based on at least one value stored in the programmable sample pattern table, wherein the at least one value is selected from the programmable sample pattern table based on, at least in part, a location of one or more corresponding pixels.

18. The system of claim 17, wherein the PPU further includes a second hardware unit configured to:

store the one or more values in one or more corresponding entries of a second programmable sample pattern table, and perform a second anti-aliasing operation based on at least one value stored in the second programmable sample pattern table.

19. The system of claim 17, further comprising:

a host processor coupled to the PPU via a bus, wherein the host processor is configured to generate instructions that cause the hardware unit to store the one or more values in the programmable sample pattern table; and a memory storing a copy of the one or more values.

* * * * *